(12) United States Patent
Essame et al.

(10) Patent No.: US 7,721,149 B2
(45) Date of Patent: May 18, 2010

(54) METHOD FOR VERIFYING REDUNDANCY OF SECURE SYSTEMS

(75) Inventors: Didier Essame, Le Plessis Robinson (FR); Philippe Forin, Guyancourt (FR); Benoit Fumery, Bures sur Yvette (FR)

(73) Assignee: Siemens Transportation S.A.S., Chatillon (FR)

( * ) Notice: Subject to any disclaimer, the term of this patent is extended or adjusted under 35 U.S.C. 154(b) by 391 days.

(21) Appl. No.: 11/521,827

(22) Filed: Sep. 15, 2006

(65) Prior Publication Data

US 2007/0067674 A1 Mar. 22, 2007

(30) Foreign Application Priority Data

Sep. 16, 2005 (EP) .................................. 05291923

(51) Int. Cl.
*G06F 11/00* (2006.01)
(52) U.S. Cl. .................................. 714/11; 714/4; 714/12
(58) Field of Classification Search .................. 714/11, 714/12, 10; 700/3; 326/11
See application file for complete search history.

(56) References Cited

U.S. PATENT DOCUMENTS

| 3,864,670 | A | | 2/1975 | Inoue et al. | |
|---|---|---|---|---|---|
| 4,321,666 | A | * | 3/1982 | Tasar et al. | 714/10 |
| 4,616,312 | A | * | 10/1986 | Uebel | 714/11 |
| 4,823,256 | A | * | 4/1989 | Bishop et al. | 714/10 |
| 5,005,174 | A | * | 4/1991 | Bruckert et al. | 714/11 |
| 5,689,632 | A | * | 11/1997 | Galy et al. | 714/11 |
| 5,777,874 | A | * | 7/1998 | Flood et al. | 700/82 |
| 6,850,807 | B2 | * | 2/2005 | Tahira | 700/79 |
| 2002/0152418 | A1 | * | 10/2002 | Griffin et al. | 714/11 |
| 2005/0149795 | A1 | | 7/2005 | Manoni | |

FOREIGN PATENT DOCUMENTS

| EP | 1 089 175 A | 4/2001 |
|---|---|---|
| EP | 1 283 468 A | 2/2003 |
| GB | 2 315 587 A | 2/1998 |

OTHER PUBLICATIONS

Derwent Abstract—EP 1 283 468 A2; Feb. 12, 2003; Siemens Aktiengesellschaft, D-80333 München, Germany.
Derwent Abstract—EP 1 089 175; Apr. 4, 2001; Matra Transport International; F-92542 Montrouge, France.
D. Essame, J. Arlat and D. Powell "Padre: a Protocol for Asymmetric Duplex Redundancy"; Fault Tolerant Systems 12, pp. 229-248, IEEE Computer Society Press, 1999.

* cited by examiner

*Primary Examiner*—Yolanda L Wilson
(74) *Attorney, Agent, or Firm*—Laurence A. Greenberg; Werner H. Stemer; Ralph E. Locher

(57) ABSTRACT

A secure system has two computers that are intrinsically safe and implements a method for verifying the redundancy for the outputs where a very high level of safety is required. The method makes it possible to handle inconsistencies in the outputs of the two computers when they are working in redundant mode. Each computer receives the output states determined by the other computer and compares them to states calculated. A state of divergent operation is detected if the computers have determined two different states for a single output. If a divergence is detected for at least one output, the state of that output is determined by preventing any transition from a restrictive state to a permissive state.

6 Claims, 4 Drawing Sheets

METHOD FOR VERIFYING REDUNDANCY OF SECURE SYSTEMS

BACKGROUND OF THE INVENTION

This invention relates to processing systems that require a high level of operational safety, in particular the processing systems used in the transportation of people. More specifically, the invention concerns a processing system that has two computers that are intrinsically safe providing a suitable level of safety and, in particular by implementing a redundant configuration, good system availability in the event of one of the computers failing.

Applications relating to secured verification/command processing are commonly used in automated transport, such as automatic urban trains. These applications use intrinsically safe computers that are capable of guaranteeing secure operation and detecting operating errors in the processing effected. An example computer is described in EP-A-1 089 175. The computer implements a technique that includes detecting errors by means of a data encoding system and, if necessary, ensuring commands are in a safe position for passengers, which may include stopping the train.

Performing an emergency stop on the train is not good for the passengers or the profitability of the trains. For this reason, the command system must be duplicated to enable it to tolerate faults: computers are organized into pairs so that one can replace the other in the event of a fault. However, this duplication may result in new safety problems. It is possible to imagine a number of scenarios in which the back-up computer does not have a consistent view of the environment and compromises the safety of the command if it takes over.

To prevent inconsistency between two computers, a method is known for ensuring that they receive and process exactly the same data in the same order. However, even if they are receiving the same inputs, it is not impossible that the two computers provide different results, which may be safe when taken individually, but that may result in a more significant fault if the situation persists.

Equally, a divergence between results may well be a temporary situation that neither poses a serious problem nor requires any safety measures to be taken that may cause a nuisance to traffic.

A redundant processing system is described in the article by D. Essamé, J. Arlat and D. Powell entitled '*PADRE: a Protocol for Asymmetric Duplex Redundancy*' published in *Dependable Computing for Critical Applications* (*DCCA*-7), C. B. Weinstock and J. Rushby, Eds., and *Dependable Computing and Fault-Tolerant Systems* 12, pp. 229-248, IEEE Computer Society Press, 1999 (Proc. IFIP 7th Working Conf. held in San Jose, Calif., USA, January 1999). This article describes, from a theoretical point of view, an asynchronous system for managing duplex redundancy in the basis of intrinsically safe processing units. In particular, this article introduces the principle of detecting potential contextual inconsistencies between redundant processing units. However, the asynchronism of this management mechanism and the lack of precise information on the way contextual inconsistencies are detected mean that the mechanism described in the article is not entirely applicable to the a verification/command system generating secure digital outputs requiring good responsiveness.

SUMMARY OF THE INVENTION

The invention proposes creating a secure redundant system using two intrinsically safe computers that are equipped with secure digital outputs and that implement a method for managing synchronous redundancy. In particular, the invention proposes a mechanism designed to detect contextual inconsistencies in secure digital outputs, specifically in relation to railway systems. The method will make it possible to manage inconsistencies between the outputs of two computers when they are operating in redundant mode.

This new redundancy management protocol is not intended to safely guarantee the equality of the contexts of two computers. Its implementation in a safety plan will be more flexible and it is based on the definition of a new principle, as follows: any contextual divergences between two computers are not dangerous provided that they do not occur in a manner that is not safe in the 'safety variables' leaving the computer (digital safety outputs or outputs of safety messages to be transmitted). On the other hand, any contextual divergence could become dangerous if for one of the two computers there is at least one safety output issued by a system to the outside that is more permissive than the one that calculated it. In this case, safety could be compromised and the computer in question must not be authorized to take over. If this did happen, it would create a configuration that would not normally be possible with a single computer, and safety would no longer be guaranteed. It should be remembered that, as each computer is intrinsically safe, it can issue more restrictive outputs in the event of a fault, but never the other way round, i.e. more permissive outputs.

The protocol proposed here carries out checks to guarantee safety downstream of the computer processing (at software or application level). These checks are linked to the basic principle described above and are carried out primarily on all of the computer's safety outputs.

The safety check on contextual equality between two computers is therefore only necessary on start-up or the start of the reintegration of a computer previously isolated, as the result of an operating fault, for example.

This new protocol no longer really needs a safety check on the equality of 'inputs' or 'messages received' in the computers, and consequently there are no requirements arising from the protocol that relate to the nature of inputs. Specifically, safety applications will also be able to process functional inputs.

Equally, as this protocol mainly carries out safety checks downstream of the application, there is no need to guarantee that the application software in the two computers are running the same program at the same time.

So, this protocol does not require the software processed by the computers to all be linked to safety objectives, and variables or procedures not related to safety can coexist within programs.

This protocol also enables digital safety outputs between two computers to be wired ORs.

The checks relating to the basic principle described above and applied between the safety outputs of the two computers facilitate the implementation of a reintegration function in the safety plan, for example for one of the two computers.

The invention is a verification method for a system includes at least two computers each with secure outputs that can adopt a restrictive state or a permissive state. It should be noted that the restrictive state is an intrinsically safe state and that any switch to this state, even if it is untimely, cannot be unsafe. The computers can exchange data. Each computer has the same processing program to determine output states. One computer is the master, the other is the slave. This method includes operation in redundant mode in which each of the computers calculates the output states, and it includes the following stages: reception of the output states determined by the other computer, comparison of each output state determined by the two computers, detection of operating divergences if the two computers have determined two different states for a single secure output, and, if a divergence is detected for at least one secure output, determination of the state of the divergent output in question by preventing any transition from a restrictive state to a permissive state.

For timeable outputs, the state of divergent outputs remains at the level determined during the previous processing cycle. For non-timeable outputs, divergent outputs enter a restrictive state.

According to another aspect, the invention is also a processing system with two secure computers, each computer having inputs to receive data from external sources, outputs to issue output states that may adopt a restrictive state or a permissive state, message outputs (also referred to as remote outputs), a memory for storing programs and data, at least one processor for running the programs contained in the memory, in particular a program for determining the state of the outputs using the input data and internal variables stored on the memory, and a means of synchronization and communication for synchronizing with the other computer and exchanging data with it. Each computer also includes parts of computer programs stored in the memory, said parts of computer programs include instructions that can be run by the processor to implement the system verification method described above.

BRIEF DESCRIPTION OF THE SEVERAL VIEWS OF THE DRAWINGS

The invention is further explained in the description below, which also sets out additional details and advantages. The description makes reference to the attached figures, as detailed below.

DETAILED DESCRIPTION OF THE SEVERAL VIEWS OF THE DRAWINGS

Figure 1:
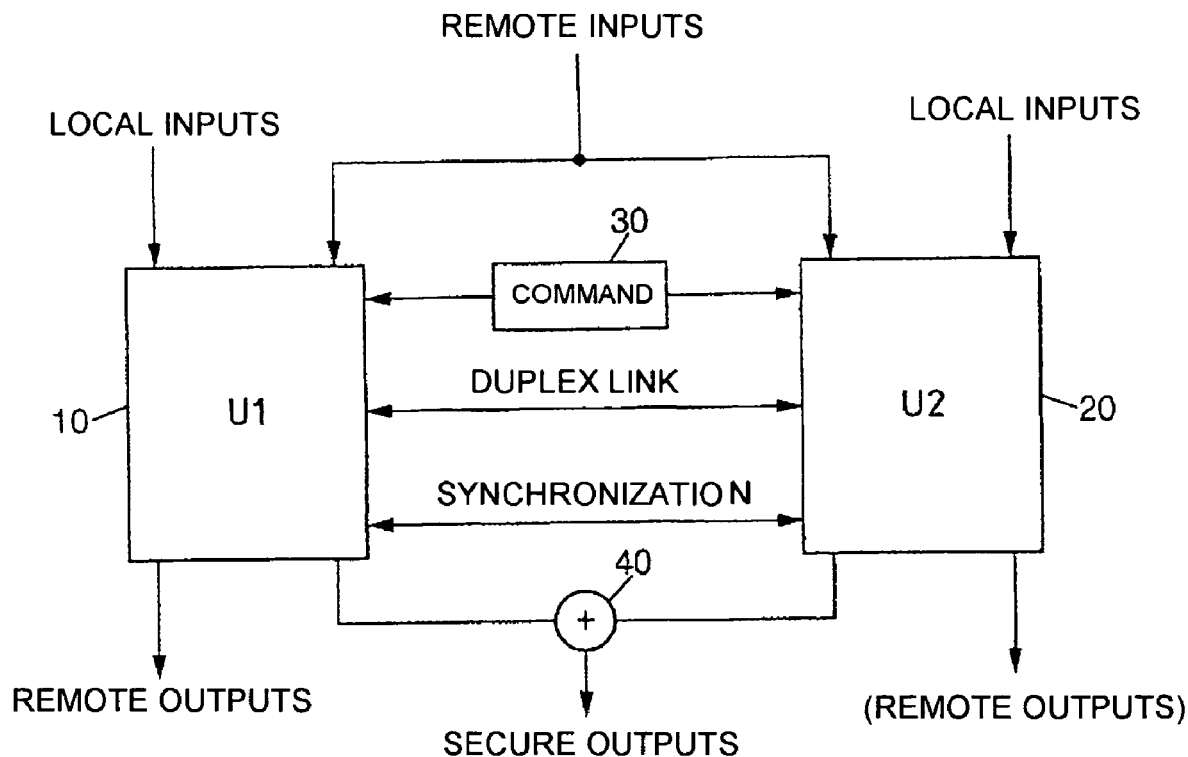
FIG. 1 shows a processing system according to the invention.

FIG. 1 shows a processing system according to the invention. The processing system is described as being included in a railway vehicle as it is an application that meets the required level of safety. However, such a processing system may be used in a fixed railway management device or in any other field other than railway transport, if such a field requires the use of secure processing systems providing a level of safety that is comparable with railway transport systems. The processing system includes first and second computers 10 and 20, for example of the type described in EP-A-1 089 175. Each of the computers 10 and 20 is intrinsically safe.

Each computer 10 or 20 has a plurality of local inputs, a plurality of remote inputs, a plurality of remote outputs, a plurality of secure outputs, synchronization inputs/outputs, duplex inputs/outputs and command inputs. Each computer 10 or 20 also has a processor, a memory and a means of securization. As a general rule, only one unit (master), for example the computer 10, generates remote outputs.

A computer's remote inputs are messages sent by a system, such as a traffic management unit, providing information to the on-board computer, for example the free distance in front of it or between it and the next stopping point. Local inputs are linked to sensors and are sampled cyclically by the computer, to determine the physical state of the vehicle, for example.

Secure outputs are linked to elements that act directly on the vehicle. These secure outputs are outputs that can adopt two states, classically a restrictive state and a permissive state. The term restrictive state is used to refer to states that involve a safety response, i.e. that trigger or stop an action in order to put the element commanded into a safe state for passengers. For example, the restrictive state of a brake is the application of the brake, and the restrictive state for the drive mechanism is stopping the drive mechanism. To deal with power outages, it is common to have a restrictive state with a logical level of zero corresponding to an absence of power.

Remote outputs make it possible, for example, to send messages to a traffic management unit. The messages sent are, for example, vehicle-state messages and location messages.

The computer memory is used to store data and programs. One of these programs is a processing program used to safely determine the status of the outputs on the basis of the input data and internal variables. Another program concerns the redundant operation to which this invention relates. The programs stored in the memory are instructions that can be understood, and consequently run, by the processor.

Each of the processors 10 and 20 has the same programs used to effect the same calculations. The calculation program is executed cyclically in order to regularly calculate output states based on the input states. The processing time is very quick so that real-time calculations can be obtained, which in turn enables fast reaction times. For example, a calculation cycle takes 100 milliseconds.

The calculation of output states made by each computer 10 and 20 includes, in each cycle, sampling all of the inputs, making the necessary calculations to determine the output states, and sending these states to the different outputs to command, for example, the vehicle elements and to provide data to at least one traffic management unit. These output states are calculated safely by each of the computers, i.e. even in the event of a fault, the output states provided by each of the computers independently must correspond to a safe state for the passengers of the vehicle.

Each computer is equipped with a means of securization that enables it to detect its own failure. The means of securization play an active role in the intrinsic safety of the computer. According to a known technique, the means of securization work with the processor to make encoded calculations in parallel with the programs that must be secured in order to detect any inconsistency in the programs. Other known techniques may be used for this purpose, but the invention does so quickly. If a fault is detected, the means of securization neutralize the computer quite quickly by switching all of the outputs to a restrictive state. Once neutralized, the computer can only start operating again once it has been reset.

This processing system is, for example, placed in an automatic railway vehicle. The local inputs are data inputs from vehicle elements. The remote inputs are inputs originating outside the vehicle from, for example, a radio link that enables communication with the traffic management unit. The remote outputs are used to sent messages to the traffic management unit, using a radio link for example. The secure outputs are command outputs for the vehicle elements. The duplex synchronization links for the computers 10 and 20 are linked together to ensure the synchronization of the two computers. The duplex communication inputs/outputs of the two computers are linked together to enable the two computers to exchange data.

A command circuit 30 operates in parallel with the computers 10 and 20 and receives, either constantly or very regularly, data on the operation of each of the computers 10 and 20. The operating data is provided by the securization means of each of the computers 10 and 20 and indicates whether the computer has a fault or whether it is operating normally. The command circuit 30 determines which of the computers 10 and 20 is master and which is slave. Determining whether a computer is master or slave is done using a program that chooses a master on the basis of arbitrary data (such as the time or the day), reliability statistics or maintenance data. The command circuit 30 also takes into account computer failures to change the master if necessary. If one of the computer 10 and 20 is found to be faulty, the command circuit 30 reacts to check that the computer is operating as a slave or, if it was previously master, to switch it to slave. The command circuit 30 also safely ensures that only one of the computers is made master.

The secure outputs are linked to an addition circuit 40 that in reality may be implemented, for example, using wired ORs by linking together the outputs of each of the computers. For this purpose, it is preferable for each of the computers to have outputs that allow this type of wiring. The advantage of using wired ORs is that all of the outputs of a computer need only be set to zero for them to be disregarded (remember that a zero state or an absence of power in an output corresponds to its restrictive state). This makes it possible to use a relatively simple, and therefore safe, points system.

As known in particular from the Article by Essamé et al., a redundant configuration of two safety computers produces a reaction that may be unsafe. In particular to counter certain problems linked to redundant configurations, the synchronization link between the two computers 10 and 20 ensures the correct time synchronization between the two computers 10 and 20. Equally, the duplex communication link between the two computers 10 and 20 is used to exchange data between the two computers. The data exchanged may be, for example, input and output data from the two computers 10 and 20, or internal data used to update a computer's context with the context from the other computer. The data exchanged using this communication link enable the two computers to operate with the same context, in particular when reintegrating a computer. However, as stated above, once they are in redundant mode, the two computers only ensure that they are getting the same inputs and generating the same outputs. Consequently, the data exchanged over this communication link allows the two computers to operate in a redundant configuration while guaranteeing system safety.

Figure 2:
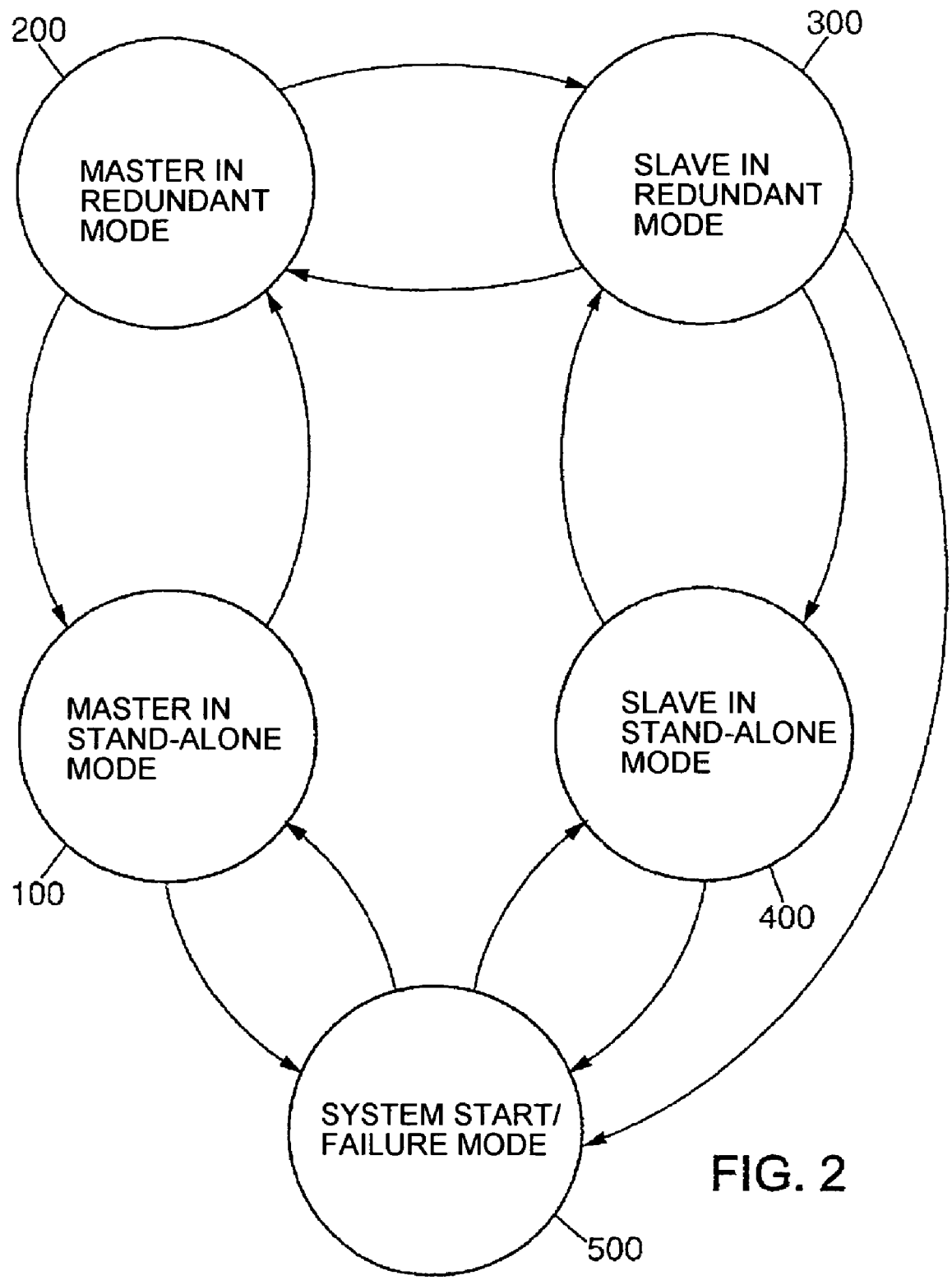
FIG. 2 shows a diagram of the operating states of a processing system computer.

To implement a redundant configuration for the two computers 10 and 20, each computer is set to operate as master or as slave, the master/slave state being determined by the command circuit 30. Furthermore, two operating modes are set up: one 'redundant' mode in which the two computers operate simultaneously, and one 'stand-alone' mode in which only one computer is active. In addition to this, if a computer fails, it is restarted and reset, FIG. 2 shows a diagram of operating states in a computer that may adopt any one of the five states described, specifically: state 100 in which the computer operates as master in stand-alone mode, state 200 in which the computer operates as master in redundant mode, state 300 in which the computer operates as slave in redundant mode, state 400 in which the computer operates as slave in stand-alone mode, and state 500 in which the computer operates in a system restart or failure mode. The arrows between the different states represent the changes of state authorized according to the invention.

So, if a master computer is operating in stand-alone mode 100, it can switch to redundant mode and remain master 200 or to failure mode 500. If a master computer is operating in redundant mode 200, it can switch to stand-alone mode and remain master 100 or switch to slave and remain in redundant mode 300. If a slave computer is operating in redundant mode 300, the computer can switch to a master state and remain in redundant mode 200, to stand-alone mode and remain slave 400 or to failure mode 500. If a slave computer is operating in stand-alone mode 400, it can switch to redundant mode and remain slave 300 provided that its context is identical to the master context, or to failure mode 500. If a computer is operating in failure mode 500, it can switch to slave state in stand-alone mode 400 or to master state in stand-alone mode 100. A computer can only switch from a failure state to a master state in stand-alone mode if both computers are in a failure state 500, i.e. when starting or restarting the entire system. The different changes from one operating mode to another are limited to ensure that a computer whose context is not consistent with the state of the system cannot take over.

The computers always operate in the same mode: redundant or stand-alone. The command circuit 30 ensures that only one computer is master, but each of the computers 10 and 20 safely determines the operating mode to apply.

Redundant mode is the nominal operating mode of the operating protocol according to the invention. When in redundant mode, the two computers operate in parallel and it is always possible for one of the two computers to take over from the other in the event of a failure.

In stand-alone mode, only the master computer is deemed to be operating safely. The slave computer is deemed to be operating incorrectly and must be restarted. It is in a pending state in which it attempts to return to redundant mode.

Start-up includes resetting all of the internal data in the computer and entering stand-alone mode once start-up is complete.

Determination of Master and Slave:

This stage is used to determine, on the basis of arbitrary, statistical or maintenance data, which of the computers 10 and 20 (according to FIG. 1) should be made master. An example of the use of arbitrary data may be that computer 10, hereinafter U1, is made master on even days and computer 20, hereinafter U2, is made master on odd days. An example of the use of statistical data may be that the selection is made on the basis of the failure rates of U1 and U2. Maintenance data may be used to determine the choice between U1 and U2 depending on the completion of maintenance tasks by the computers when in operation, making the computer with the highest level of availability the master.

Figure 3:
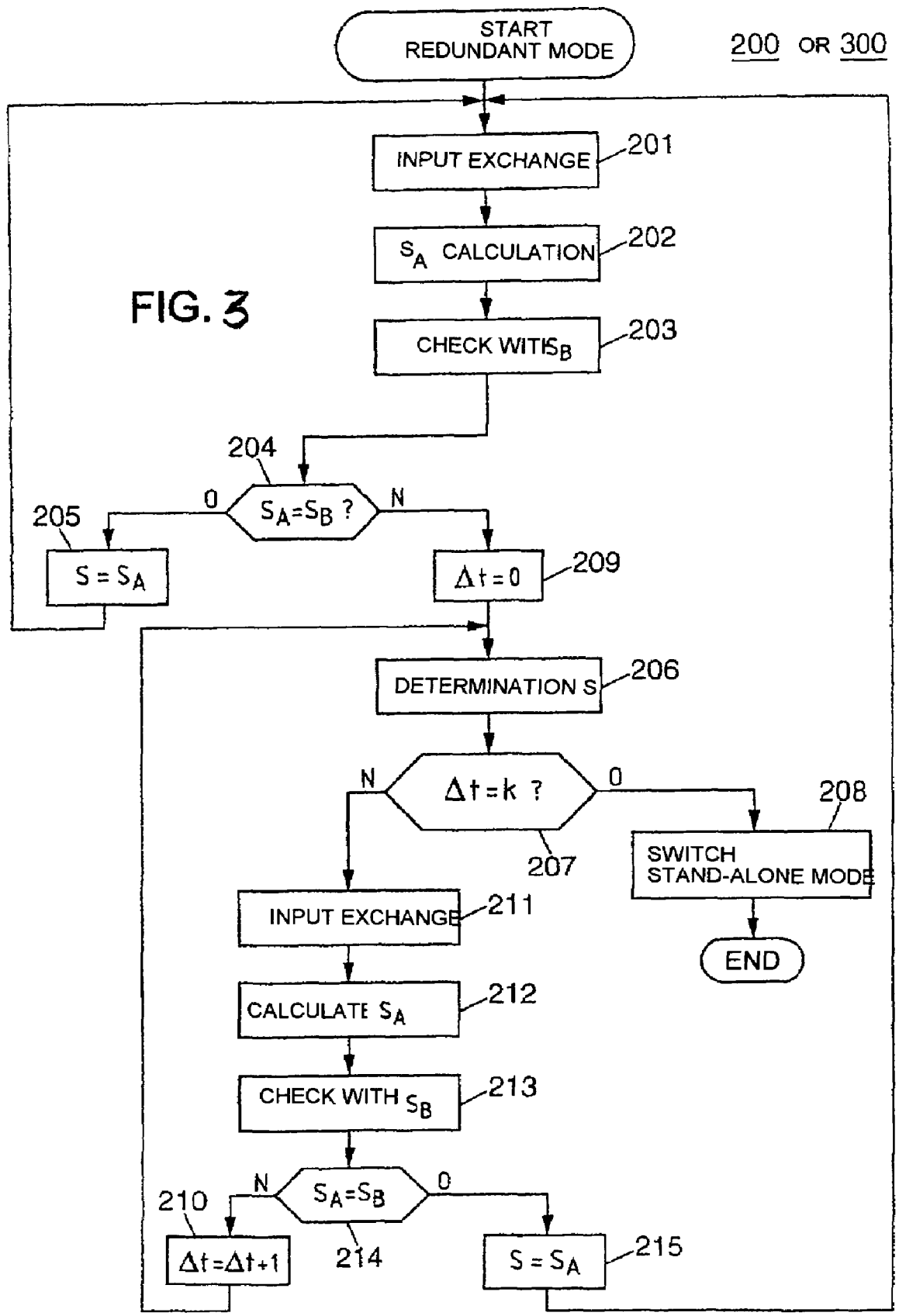

Operation in Redundant Mode:

Operation in redundant mode is the nominal operating mode for the processing system. One of the computers works as master and the other as slave. However, the two computers operate in parallel using the same data to obtain, normally, the same results. FIG. 3 is a flowchart of the operation of a computer operating in redundant mode. The only operating difference between a master and a slave concerns the remote outputs, which are neutralized by the slave computer.

According to the protocol implemented in the invention, the two computers make sure that they are synchronized with the other one and exchange their inputs, stage 201, with the other to maintain the same context. Each computer receives local inputs from its own sensors or from sensors shared by the two computers 10 and 20. Each computer samples the local inputs. Even if computers 10 and 20 are synchronized with each other, an analogue input can change between the times each of the two computers samples it. Consequently, it is possible for a single input read by each computer to have a different value and this could cause different output states. For this reason, the computers exchange their input data so that their inputs are identical.

Each computer then runs its calculation program, stage 202. The calculation program of each computer determines the outputs states $S_A$ depending on the inputs. The calculation programs are identical and the results should usually be identical.

Once the calculations are complete, each computer receives the output states $S_B$ calculated by the other computer in order to verify redundancy, stage 203.

As indicated above, and without any failure in either one of the computers, they may still operate non-identically, which is a source of global system failure. The comparison of the output states of the two computers is used to detect divergences in the outputs, test 204.

If all of the output states are identical, which is considered to be normal operation, then the master computer sends the messages calculated over the remote outputs to a remote unit, and the two computers send their calculated outputs states $S_A$ simultaneously over their outputs S, stage 205. The output states of the two computers are recombined using the addition circuit 40. Another calculation cycle is then performed by exchanging the input data again, returning to stage 201. This is normal system operation.

If during normal system operation one of the computers 10 or 20 fails and it was the master computer, the command circuit 30 swaps the master and slave computers around. Acknowledgement of the master/slave status is effected before stage 201 is run again.

When comparing outputs, divergences may be detected on one or more outputs. Divergences are characterized by at least one output state being different between the two computers. This divergence indicates that the safety of the system may not be guaranteed as the two computers have conflicting behaviors. Switching to one of the two computers is not necessarily the correct instant response. Indeed, there can well be a divergence on an output without either of the computers having a fault. Such divergences may be isolated and have no impact, or they may indicate a more serious system failure. By arbitrarily stopping one of the two computers, one risks making that computer unavailable when it was the other computer that had failed.

Several possibilities need to be considered in the event of a divergence, the first concerning the remote outputs. Remote outputs are messages on the state of a vehicle and its position that are sent to a remote unit. If there is a divergence on the remote outputs, no messages should be sent, as it is better to send no message than to send a false message. If the divergence persists on the remote outputs, the system should be switched to stand-alone mode. This operation can be effected in several calculation cycles. As this first case is not critical and as the secure outputs are different, it is not covered by the flowcharts described.

A second, more worrying, case concerns secure outputs. A distinction is made between timeable secure outputs and non-timeable secure outputs. A secure output is deemed to be timeable if it can be kept in a permissive state for a period of time without adversely affecting passenger safety, even if it should switch to a restrictive state. A secure output is deemed to be non-timeable if it may have an adverse effect on passenger safety if it remains in a permissive state.

If there is any divergence between the two computers, the system is switched to a restrictive operating mode. The computers then determine the output states S to be applied restrictively, stage 206. Regardless of the type of secure output that the divergence occurred in, it is advisable according to the invention to block any switch from a restrictive state to a permissive state in the secure output.

If there is a divergence on a non-timeable secure output, its state should be forced to a restrictive state.

If there is a divergence on a timeable secure output, its state may remain the same as the previous state. Determination of state must prevent a switch from a restrictive state to a permissive state. Furthermore, a computer cannot set a permissive output if it has calculated a restrictive output. The determination made by the two computers may be the same or remain divergent, in any case the combination of outputs effected using the addition circuit 40 ensures that the divergent output remains in the previous state.

Having determined and applied the output states S, it should be determined whether the divergence was merely an isolated divergence or whether the divergence is linked to a failure of one of the two computers.

If the divergence persists for a divergence time At that exceeds a predetermined duration k, test 207, then the computers switch to stand-alone mode, stage 208. Once one of the computers 10 and 20 has switched to stand-alone mode, it forces the other computer 20 or 10 to switch. Divergence time is measured in numbers of calculation cycles. This divergence time Δt is reset when a divergence is detected, stage 209, and it is, for example, incremented after each divergent calculation cycle, stage 210.

As long as the predetermined duration k has not been reached, the calculation cycles continue to exchange inputs, stage 211, calculating the output states $S_A$, stage 212 and comparing the calculated states $S_A$ with the states $S_B$ calculated by the other computer, stage 213 and test 214.

If during a calculation cycle the outputs are no longer divergent, the system returns to its normal operating mode by applying to its outputs S the calculated output states $S_A$, stage 215. The computers then execute stage 201.

When a calculation cycle reveals a divergence, operation remains restrictive. The divergence time Δt is incremented and the output states S are made restrictive in stage 208.

In the event of a divergence, the restrictive state of an output could be maintained as long as there is a divergence between the two computers. If restrictive operation lasts too long, unavailability may be caused. To avoid this, a predetermined duration k that is relatively short but still long enough to enable master/slave swap should be used. For example: a predetermined duration k of two or three calculation cycles would be suitable.

If a computer fails during the predetermined duration, master/slave state switching may be determined by the command circuit 30. However, acknowledgement of master/slave state is only effected after stage 210.

It should be noted that when determining outputs, stage 206, the two computers may determine the same state if the previous output was restrictive, but they may determine two different states if the previous state was permissive.

In order to determine the source of a fault, each computer has a malfunction detection circuit (equivalent to a watchdog) that informs the command circuit 30 whether or not it is faulty. If the master computer fails, the command circuit 30 swaps master and slave. This swap is made during the predetermined duration k and remains entirely transparent in terms of the overall operation of the processing system.

The faulty computer is automatically switched to slave by the command circuit 30 and switching the outputs of the faulty computer to a restrictive state causes an inconsistency in the outputs that then switch the master computer to stand-alone mode as the faulty computer has switched to failure mode.

So, if a failure is detected in the master computer, the master computer becomes the slave and vice versa. The switch to stand-alone mode is made without stopping the system, retaining the computer most capable of commanding the system.

Figure 4:
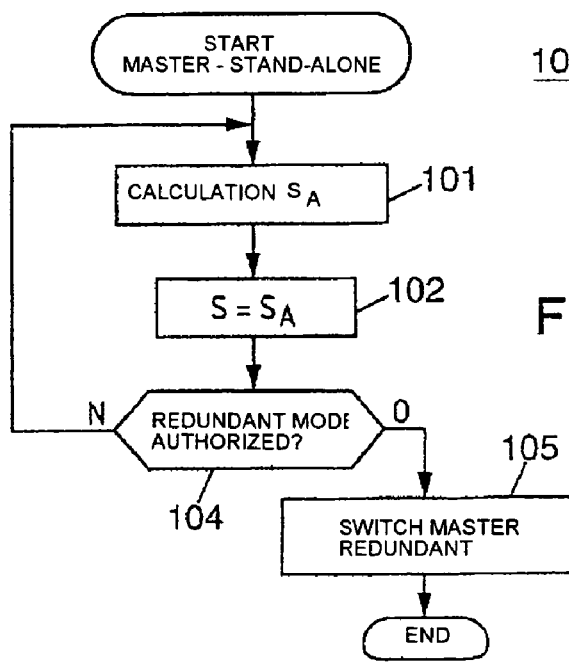
FIGS. 3 to 5 show the flowcharts used by the processing system to operate according to the invention.
Figure 5:
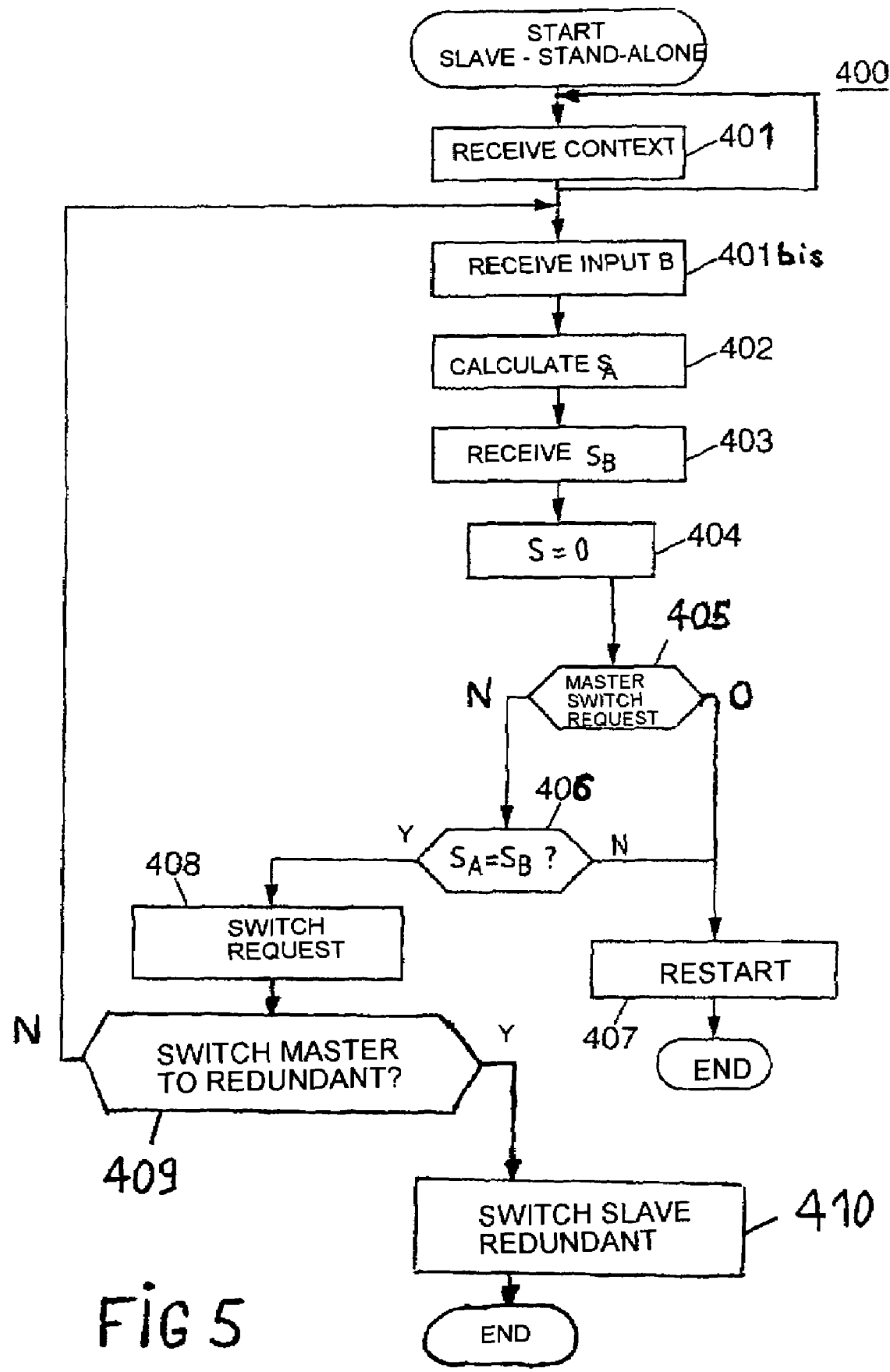

Operation in Stand-Alone Mode:

In stand-alone mode, only the master computer operates actively, while the slave computer is neutralized. FIG. 4 is a flowchart showing how a computer operates when in master state. FIG. 5 is a flowchart showing how a computer operates when in slave state. These two flowcharts are executed in parallel. The two computers are kept synchronized, i.e. the calculation cycles run at the same time.

Stand-alone mode is a temporary operating mode. It is triggered during system start-up when both computers are started up following an initialization state, if any inconsistency is detected between the two computers or if only one of the computers is restarted. Switching from start-up mode to stand-alone mode in a master state can only occur if both computers are started or restarted together, and therefore the computers must be in the initialization state (all computer outputs and variables in restrictive state).

The master computer according to FIG. 4 only takes into account its own inputs to calculate the output states $S_A$, stage 101, which are applied, stage 102, over the system outputs S. The inputs and outputs of the slave computer are not taken into account by the master computer. Thus, the system operates safely as a single computer. However, the master computer communicates its inputs, internal variables and output states to the slave computer. In normal operation, the master computer links the calculation cycles thus. Here, the outputs of the slave computer are all forced to be restrictive to the outside in stand-alone mode.

In order to return to operation in redundant mode, the master computer must first send its context to the slave computer. It then checks whether a switch to redundant mode is possible, test 104. A switch of mode is only possible if the slave computer requests it once it has detected that it is convergent with the output states of the master computer. The master then checks that the contexts are the same, i.e. that the internal variables are the same for the slave and the master. To reduce the verification time, a signature may be used for the internal variables. Contextual consistency may be verified over several calculation cycles. If there is a switch to redundant mode, stage 105, the slave computer is simultaneously switched to redundant mode.

If the master computer fails before switching to redundant mode, this may result in the system being unavailable until the computer is restarted.

In stand-alone mode, the system behaves at worst like a single computer. The output states therefore remain safe as the computer is intrinsically safe.

To prevent hardware unavailability, it is therefore necessary to return to redundant mode as quickly as possible. For the slave computer, stand-alone mode is a mode used to ensure consistency with the master computer. For example, a slave computer is in stand-alone mode if it has just restarted with internal variables that have been reset, or if it was previously in redundant mode but divergent with the master computer. In all cases, the operating context of the slave computer is assumed to be different to the operating context of the master computer.

The slave computer effects the calculation cycles in which it receives inputs from the master computer, stage 401, accompanied by contextual data from the master computer to update its internal variables. As there are a large number of internal variables, several thousand for example, the transfer of internal variables may be divided over several calculation cycles. Certain variables may change between cycles, and in such cases these variables must be transferred several times. The slave computer then calculates the output states $S_A$, stage 402. It also receives the output states $S_B$ from the master computer, stage 403, to check its calculated output states $S_A$. The outputs of the slave computer to the outside are in any case set to a zero state, stage 404, so that the addition circuit 40 can provide the output states of the master computer only.

A stage 405 is provided for to request the slave computer to become master, but this point will be covered later.

Otherwise (case N), the slave computer checks whether or not the outputs are divergent with the master computer, test 406.

If the slave computer is divergent, test 406 case N, it restarts, stage 407.

If the slave computer is convergent, test 406 case Y, it requests the master computer to switch to redundant mode, stage 408. This request triggers the context verification process 409 in a given cycle, corresponding to all of the internal safety data storable by the master computer. If the result of the check of the internal data by the master is positive, the master switches to redundant mode by bringing the slave computer into redundant mode, stage 410. Context verification effected by the master in a given cycles may be realized over several calculation cycles. However, if during one of these calculation cycles the slave's outputs become inconsistent with the master computer according to stage 406, case n, it restarts in phase 407 and stops requesting the switch to redundant mode, which cancels the check carried out by the master.

As long as the slave computer is divergent, it is not possible to return to redundant mode. If the slave computer does not manage to converge with the master, it means that the exchange of internal data is insufficient and that it is preferable to reset the slave computer to start again from a better base.

If the master computer also fails while the slave computer is operating in stand-alone mode, the control circuit 30 instructs the slave to switch to master. Such a hand-over is not possible because the context of the slave is not deemed to be consistent with the general state of the system. The slave should now be restarted. Test 405 checks if the slave has been requested to switch to master in order to effect, following stage 405 and in case (Y), the reset stage 407 and to restart the entire system.

The method described above relates to a supervision program for the redundant configuration of two computers. A person skilled in the art will appreciate that a simple software update within the system will suffice to implement the invention.

We claim:

1. A method for checking a system requiring a high level of operational safety for transportation, comprising at least two computers each with secure outputs configured to adopt one of a restrictive state and a permissive state, the restrictive state being an intrinsically safe state, said computers configured to exchange data with each other, each intrinsically safe computer having the same calculation program to determine output states $S_A$, one computer being a master computer and the other being a slave computer, wherein the two computers are equipped with securitization means to detect their own operating failure, and wherein, if a failure of the master computer is detected, the master computer becomes the slave, said method comprising:

a) a redundant operating mode in which each of the computers calculates the outputs states, the redundant operating mode comprising:

receiving output states $S_B$ determined by the other computer, comparing, for each output, the states determined by the two computers, detecting a state of divergent operation if the two computers have determined two different states for a single secure output, and if a divergence is detected for at least one secure output, determining the state of said divergent output by preventing any transition from a restrictive state to a permissive state, b) a temporary operating mode in a stand-alone mode, wherein:

if a state of divergence persists beyond an initial predetermined duration k, operation of the computers switches to the stand-alone mode in which the master computer stops taking into account output states of the slave computer and the slave computer no longer generates any external outputs, for the slave computer, the stand-alone mode is a mode used to ensure consistency with the master computer, wherein, in the stand-alone mode, the slave computer receives input and context data from the master computer, calculates the output states $S_A$ using the data from the master computer, compares the output states $S_A$ calculated with the output states $S_B$ of the master computer and detects whether a state of convergence exists in which all of the output states determined by the slave computer correspond to the output states of the master computer, and in order to return to operation in the redundant mode, the slave computer requests that the master computer switch to the redundant mode, the switch to the redundant mode being possible only if the slave computer requests the switch to the redundant mode once the slave computer has detected that the slave computer is convergent with output states of the master computer.

2. The method according to claim 1, wherein the state of the divergent output retains the state determined during a previous verification cycle.

3. The method according to claim 1, wherein the state of the divergent output adopts a restrictive state.

4. The method according to claim 1, wherein, in the stand-alone mode, the master computer checks a context of the slave computer and switches to the redundant mode if the two computers share the same context.

5. The method according to claim 4, wherein, if a state of divergence persists, the slave computer is reset.

6. A processing system comprising two secure computers, one of the computers functioning as a master computer and the other one of the computers functioning as a slave computer, each computer having: inputs for receiving data from outside, outputs for providing output states that can adopt one of a restrictive state and a permissive state, a memory for storing programs and data, at least one processor for running programs stored in the memory, in particular a program for determining the state of outputs using input data and internal variables stored in the memory, wherein each computer has parts of computer programs stored in the memory, said parts of programs comprising instructions that can be run by the processor to implement a method for checking a system, wherein the method comprises: a) a redundant operating mode in which each of the computers calculates the outputs states, the redundant operating mode comprising: receiving output states $S_B$ determined by the other computer, comparing, for each output, the states determined by the two computers, detecting a state of divergent operation if the two computers have determined two different states for a single secure output, and if a divergence is detected for at least one secure output, determining the state of said divergent output by preventing any transition from a restrictive state to a permissive state, b) a temporary operating mode in stand-alone mode, wherein: if a state of divergence persists beyond an initial predetermined duration k, operation of the computers switches to a stand-alone mode in which the master computer stops taking into account the output states of the slave computer and the slave computer no longer generates any external outputs, for the slave computer, the stand-alone mode is a mode used to ensure consistency with the master computer, wherein, in the stand-alone mode, the slave computer receives input and context data from the master computer, calculates the output states $S_A$ using the data from the master computer, compares the output states $S_A$ calculated with the output states $S_B$ of the master computer and detects whether a state of convergence exists in which all of the output states determined by the slave computer correspond to the output states of the master computer, and in order to return to operation in the redundant mode, the slave computer requests that the master computer switch to the redundant mode, the switch to the redundant mode being possible only if the slave computer requests the switch to the redundant mode once the slave computer has detected that the slave computer is convergent with output states of the master computer.

* * * * *